Dec. 17, 1957  W. S. HASTINGS  2,816,377
BUMPER MOUNTED SIGN
Filed June 1, 1955  2 Sheets-Sheet 1
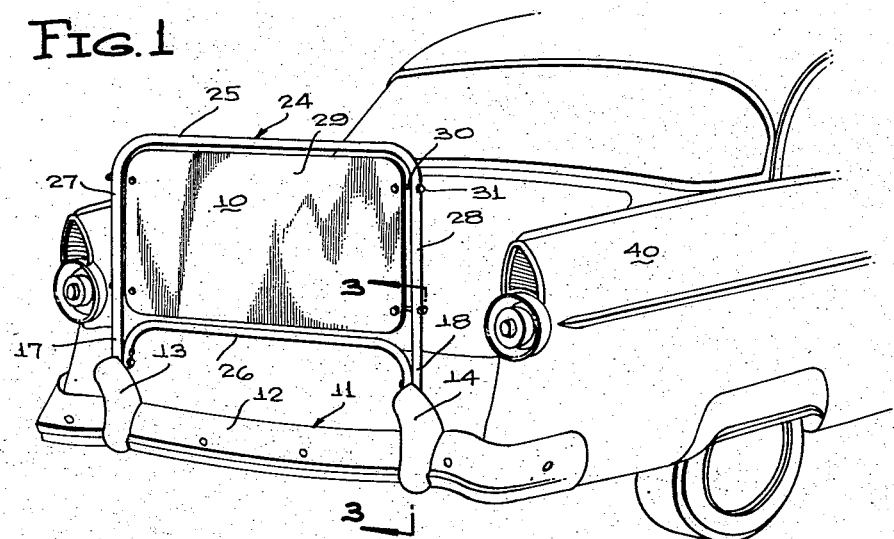
INVENTOR.
WARREN S. HASTINGS
BY
McMorrow, Berman & Davidson
ATTORNEYS

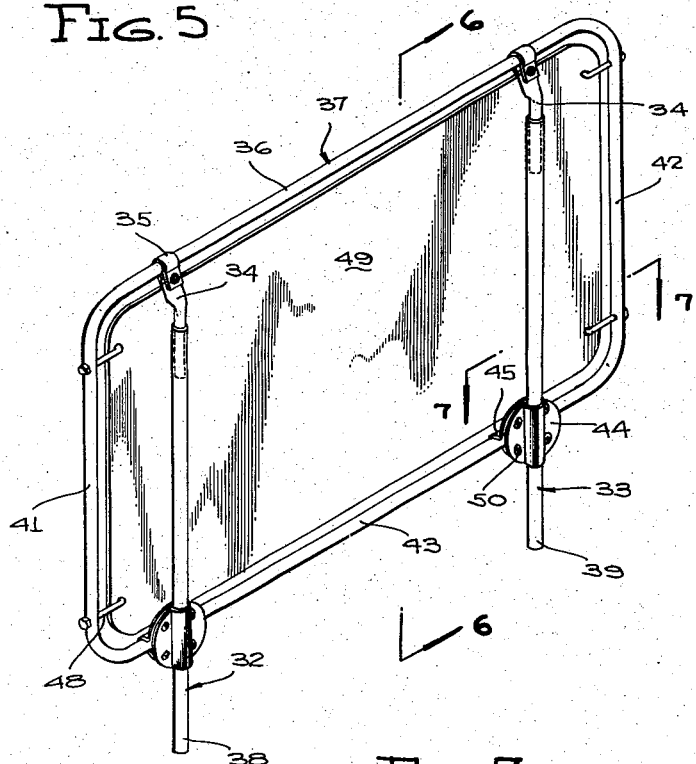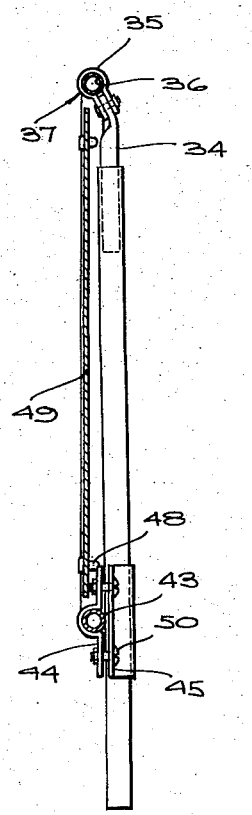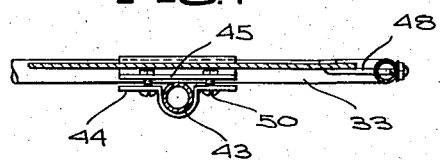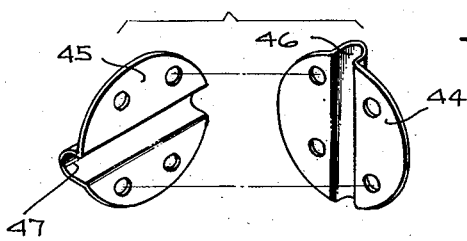

United States Patent Office 2,816,377
Patented Dec. 17, 1957

2,816,377

BUMPER MOUNTED SIGN

Warren S. Hastings, Mounds, Ill.

Application June 1, 1955, Serial No. 512,394

2 Claims. (Cl. 40—129)

The present invention relates to a display sign for attachment to the bumper of a vehicle.

An object of the present invention is to provide a display sign to be carried on the bumper of a vehicle which has means for quickly and securely attaching and detaching the sign to the bumper in such a way as to not mar or alter the bumper in any way.

Another object of the present invention is to provide a display sign for attachment to a vehicle bumper which has an easily and rapidly changeable display panel which will not rattle while the vehicle is in motion.

A further object of the present invention is to provide a display sign of neat appearance and sturdy construction, simple in structure and of few parts, and one which is economical to manufacture and assemble.

These and other objects and advantages of the present invention will be fully apparent from the following description when taken in connection with the annexed drawings, in which:

Figure 1 is a view in perspective of a first embodiment of the present invention as installed upon the rear bumper of an automobile, Figure 2 is a partial perspective view of one end of the sign of the present invention, in its first embodiment, showing in exploded form the sleeve means which attaches the sign to the bumper guard bolt of the automobile bumper assembly, Figure 3 is an end sectional view on the line 3—3 of Figure 1, Figure 4 is a vertical sectional view on the line 4—4 of Figure 2, Figure 5 is view in perspective of a second embodiment of the present invention, Figure 6 is an end sectional view somewhat enlarged on the line 6—6 of Figure 5, Figure 7 is a vertical view on the line 7—7 of Figure 5, and Figure 8 is an exploded view in perspective greatly enlarged showing the means for connecting the bottom member of the frame to the posts.

Referring in greater detail to the drawings, in which like numerals indicate like parts throughout the several views, the present invention, in a first embodiment shown in Figures 1 to 4, inclusive, consists in a display sign, indicated generally by the reference numeral 10, for attachment to a vehicle bumper assembly, indicated generally by the reference numeral 11, the latter including a horizontally-disposed bumper 12, a pair of spaced bumper guards 13 and 14 extending over the front surface of and upwardly of the bumper 12 and each having an open back in which is positioned the bumper guard bolt 15 for securing the bumper guard to the bumper, there being a hole provided in the bumper 12 receiving the bolt 15 and a nut and washer assembly 16 for detachably securing the bumper guard to the bumper.

The sign 10 has a pair of upright posts 17 and 18 arranged in spaced relation one adjacent each of the bumper guards 13 and 14, respectively. A pair of upright sleeves 19 are positioned one each below an adjacent one of the posts 17 and 18, each of the sleeves 19 having its upper end portion 20 surroundingly receiving the lower end portion 21 of the respective posts 17 or 18, the lower end portion 22 of each sleeve being flattened and curved to conform to the contour of the front surface of the bumper, as seen in Figure 3.

An aperture 23 is provided in the lower end portion 22 of each sleeve 19 receiving the bolt 15 therethrough for securing the sleeve 19 between the bumper guard 13 or 14, and the adjacent portion of the bumper 12.

An upright frame 24 is positioned above the bumper 12 and includes a top member 25, a bottom member 26, and side members 27 and 28. In this first embodiment, posts 17 and 18, the side members 27 and 28, and the top member 25 of the frame are all formed of one length of tubular steel or aluminum, or other rigid material, and the bottom member 26 extends between the upper ends of the posts 17 and 18 connecting them together.

An upright display panel 29 is carried within the frame 24 by means of a plurality of bolts 30 extending through holes in the side members 27 and 28, each bolt having its head portion 31 bent at a right angle and received in an adjacent one of a series of holes provided in the marginal ends of the panel 29. A nut and washer assembly 31 provides a means for tightening each of the bolts 30 to draw the panel 29 taut between the side members.

In the second embodiment, seen in Figures 5 to 8, inclusive, the upright posts 32 and 33 are arranged in spaced relation and are each open at its upper end to receive the lower end portion of an extensile and retractile telescopingly-arranged frame support 34, the upper end of which is received between the ends of a clamping member 35 encompassing the top member 36 of the frame 37. The lower ends 38 and 39 of the posts 32 and 33, respectively, are adapted to be received within sleeves (not shown) similar to the sleeve 19 used with the first embodiment of the present invention for attaching the posts to a bumper of an automobile 40 (Figure 1).

In this second embodiment of the present invention, the side members 41 and 42 and the bottom member 43 are contiguous with and formed from a single length of tubing with the top member 36, the ends of the tubing being concealed between one of the pairs of interengaging plates 44 and 45, the latter being seen in detail in Figure 8. The plate 44 of each pair of plates is formed with a diametrically and vertically arranged groove 46 to receive the respective one of the posts 32 or 33, and each of the plates 45 of each pair of plates has a similar groove 47 arranged horizontally to receive the bottom member 43 of the frame 37. Similar bolts 48 received through holes provided in the side members 41 and 42 and through holes in the marginal portions of the panel 49 secure the panel to the frame. Other bolts 50 secure the one plate 44 to the plate 45 of each pair of plates.

In use, the display sign, constructed in accordance to the above description, in each of its embodiments, may be attached to an automobile bumper by first removing the bumper guards from the bumper by removing the nut and washer assembly from the bumper guard bolts. The sleeves 19 are then inserted within the open back of each of the bumper guards and the bolt 15 is received within the aperture provided in the lower end portion of the sleeve and then is inserted in the bumper aperture and the nut and washer assembly is returned to its position on the bolt.

It will be seen that the upper end portion 20 of each of the sleeves 19 does not extend beyond the upper end of the bumper guard and may be left in place, removing upwardly the posts 17 and 18 to remove the sign from its erected position upon the bumper of the automobile, While here illustrated as being attached to the bumper of an automobile, having a bumper shaped as illustrated, the sign of the present invention, in each of its embodiments, may be attached to other vehicles having bumpers of other configuration, the only changes being necessary are to shape the lower end portions of each of the sleeves to conform to the front face of the bumper and to position the aperture therethrough in such a place as to support the sleeve upon the bumper guard bolt of the bumper assembly.

What is claimed is:

1. For use with a vehicle bumper assembly including a horizontally-disposed bumper, a pair of spaced bumper guards mounted on said bumper, and a bumper guard bolt detachably securing each of said bumper guards to said bumper, a display sign comprising a pair of upright posts arranged in spaced relation one adjacent each of said bumper guards, an upright sleeve having the portion adjacent its upper end surroundingly secured to the lower end of each of said posts, the portion of each of said sleeves adjacent the lower end thereof being provided with an aperture arranged transversely thereof adapted to receive the portion of the adjacent one of said bumper guard bolts between the associated bumper guard and said bumper, an upright frame including top, bottom, and side members supported on the upper ends of said posts, and an upright display panel extending across said frame between the top and bottom members and having each of its ends detachably secured to the adjacent one of said side members.

2. For use with a vehicle bumper assembly including a horizontally-disposed bumper, a pair of spaced bumper guards mounted on said bumper, and a bumper guard bolt detachably securing each of said bumper guards to said bumper, a display sign comprising a pair of upright posts arranged in spaced relation one adjacent each of said bumper guards, an upright sleeve having the portion adjacent its upper end surroundingly secured to the lower end of each of said posts, the portion of each of said sleeves adjacent its lower end being provided with an aperture arranged transversely thereof adapted to receive the portion of the adjacent one of said bumper guard bolts between the associated bumper guard and said bumper, an upright frame including top, bottom, and side members adjacent the upper ends of said posts on one side thereof and having its top member connecting the upper ends of said posts together and having its bottom member connecting said posts together intermediate the ends of the latter, and an upright display panel extending across said frame between said top and bottom members and having each of its ends detachably secured to the adjacent one of said side members.

References Cited in the file of this patent

UNITED STATES PATENTS

| | | |
|---|---|---|
| Re. 21,056 | Basket | Apr. 25, 1939 |
| 1,689,436 | Hodge | Oct. 30, 1928 |
| 2,215,001 | Jandus | Sept. 17, 1940 |
| 2,229,491 | Brooke | Jan. 21, 1941 |
| 2,431,108 | Carleton et al. | Nov. 18, 1947 |